United States Patent [19]
Kacal et al.

[11] 4,286,614
[45] Sep. 1, 1981

[54] HIGH TEMPERATURE BALL VALVE

[75] Inventors: Gary W. Kacal, Rosenberg; Charles C. Partridge, Houston, both of Tex.

[73] Assignee: ACF Industries, Incorporated, New York, N.Y.

[21] Appl. No.: 77,078

[22] Filed: Sep. 19, 1979

[51] Int. Cl.³ ............................ F16K 25/00; F16K 5/22
[52] U.S. Cl. ............................ 137/72; 137/246.22; 251/174; 251/315
[58] Field of Search ............... 137/72, 73, 74, 75, 137/246, 246.22; 251/172, 174, 175, 176, 315, 316, 317; 277/26

[56] References Cited

U.S. PATENT DOCUMENTS

| 3,174,495 | 3/1965 | Anderson et al. | 137/74 |
| 3,315,697 | 4/1967 | Oliver | 251/174 |
| 3,346,234 | 10/1967 | Allen | 251/174 |
| 3,392,743 | 7/1968 | Pennington | 251/174 |
| 3,421,733 | 1/1969 | Stewart, Jr. | 251/172 |
| 3,575,198 | 4/1971 | Ellis | 251/172 |
| 3,752,178 | 8/1973 | Grove et al. | 251/174 |
| 3,760,833 | 9/1973 | Kemp et al. | 251/174 |
| 3,990,465 | 11/1976 | Allen | 251/174 |
| 4,108,196 | 8/1978 | Calvert | 251/174 |
| 4,160,460 | 7/1979 | Kemp | 137/72 |

Primary Examiner—Martin P. Schwadron
Assistant Examiner—G. L. Walton
Attorney, Agent, or Firm—Eugene N. Riddle

[57] ABSTRACT

A ball valve includes a metal valve seat (36) carrying a relatively soft insert (40) which seals against a ported ball member (22). A packing ring (72) surrounding the seat is compressed between a spring loaded metal wedge (84) and a metal backup ring (66) to provide a seal between the seat and valve body. If the soft seals are destroyed by fire, the metal seat is pressed against the ball member to provide a metal-to-metal seal. Additional metal-to-metal seals are provided between the seat and valve body by the metal wedge and backup ring.

15 Claims, 3 Drawing Figures

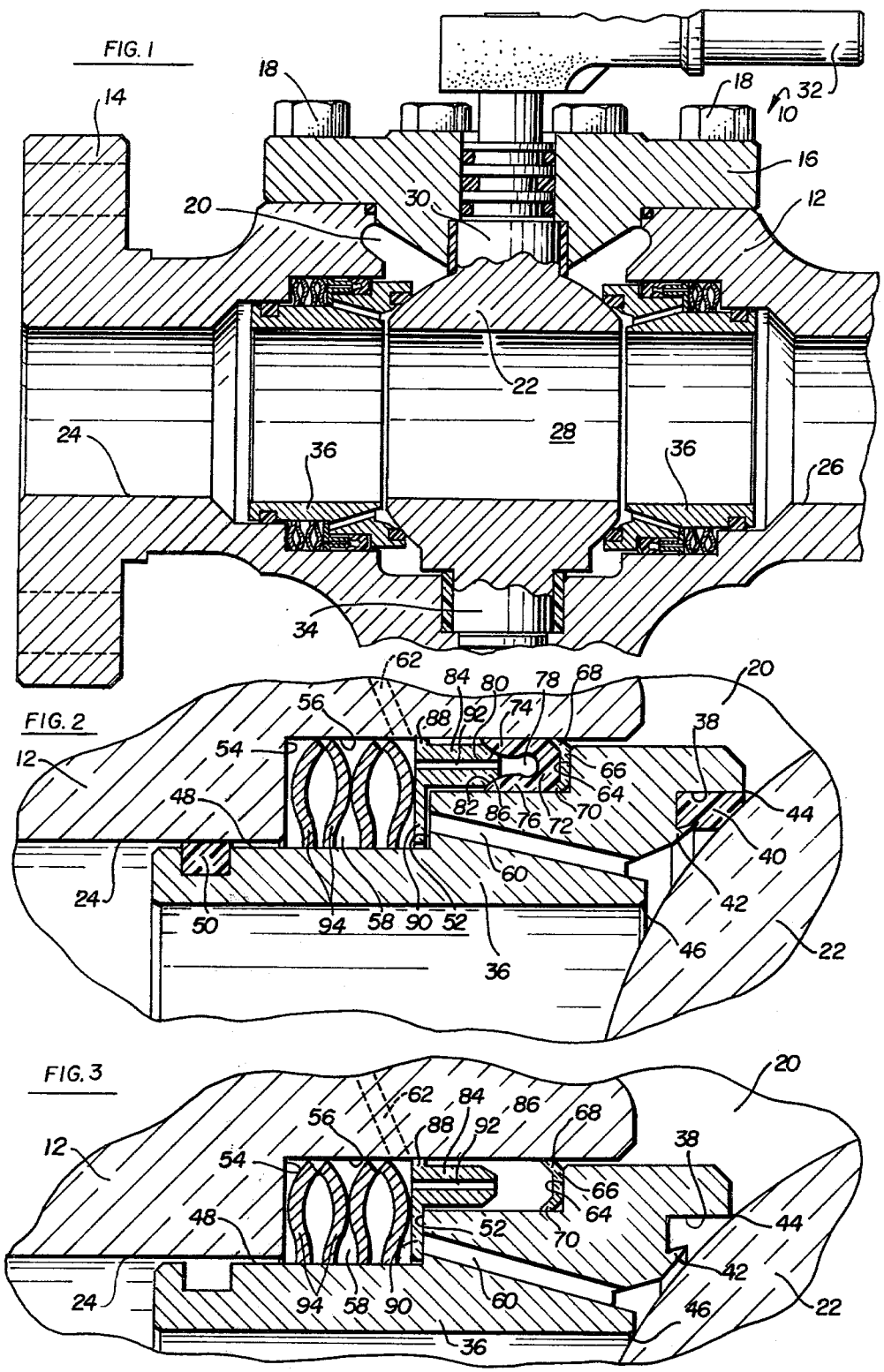

HIGH TEMPERATURE BALL VALVE

BACKGROUND OF THE INVENTION

This invention relates generally to valves and deals more particularly with a ball valve which is intended for use primarily in high temperature service.

Valves which are used to handle steam and other high temperature fluids must be capable of sealing effectively at temperatures up to approximately 500° to 550° F. In addition, valves handling combustible fluids are often required to provide an acceptable seal under fire conditions where the valve components are exposed to extremely high temperatures. Since the types of materials which seal effectively at ordinary temperatures are destroyed by fire, it is common to provide secondary metal-to-metal seals which are activated upon destruction of the primary soft seals, as disclosed in U.S. Pat. Nos. 3,346,234 and 3,990,465. Seat arrangements of this type have suffered from undue cost and complexity, due in large part to the complicated shapes that are required and the need for precise machining operations on the seats. Furthermore, the ability of such seats to seal effectively under fire conditions is wholly dependent on the action of springs which are subject to wear and other damage, particularly after extensive use. Also, there is no means for closing off the lubricant passages in the seats to avoid presenting additional flow paths for the fluid in the event of a fire.

SUMMARY OF THE INVENTION

The present invention has as its primary object the provision of a high temperature ball valve which is capable of sealing effectively against fluid leakage even in the presence of fire conditions. In accordance with the invention, a metal valve seat carries a relatively soft face seal which seals against the ball under normal high temperature service. The outside surface of the seat is sealed to the flow passage of the valve body by a soft packing ring which is squeezed between a metal wedge and a metal backup ring. Wave springs urge the wedge against the packing ring to expand it against the valve seat and body under normal conditions.

If the face seal and packing ring are destroyed by fire, the force of the wave springs and fluid pressure urges the metal valve seat against the ball to provide a metal-to-metal seal. The springs and fluid pressure also force the metal wedge to a sealing position wherein it cooperates with the metal backup ring to impede fluid leakage between the seat and body. A normally open lubricant passage formed through the valve seat is closed off by a projecting flange portion of the wedge when the packing ring is destroyed by fire.

DETAILED DESCRIPTION OF THE INVENTION

In the accompanying drawings which form a part of the specification and are to be read in conjunction therewith:

FIG. 1 is a sectional view of a ball valve which is equipped with a pair of valve seats constructed according to a preferred embodiment of the present invention;

FIG. 2 is a fragmentary sectional view on an enlarged scale showing the position of the valve seat under normal conditions; and FIG. 3 is a fragmentary sectional view similar to FIG. 2, but showing the position of the valve seat after destruction of the soft seals by fire.

Referring initially to FIG. 1, numeral 10 generally designates a ball valve which is intended for use principally in high temperature service. Valve 10 includes a valve body 12 having flanges 14 on its opposite ends for bolting of the valve to a flowline (not shown). A cover plate 16 is bolted at 18 to the top portion of valve body 12. Body 12 presents therein a valve chamber 20 in which a ball 22 is mounted for rotation to open and close the valve. An inlet flow passage 24 is formed in body 12 in alignment with an outlet passage 26 located such that valve chamber 20 is between the inlet and outlet passages. Ball 22 is mounted between passages 24 and 26 and includes a port 28 which is aligned with the flow passages when the valve is in the open position shown in FIG. 1. In the closed position of the valve, ball 22 blocks fluid flow between the flow passages. An operating stem 30 extends upwardly from ball 22 through cover plate 16 and is equipped with a handle 32 on its top end. A lower stem 34 assists in maintaining ball 22 in the proper position.

A valve seat indicated generally at 36 is mounted about each flow passage 24 and 26 at a location adjacent valve chamber 20. Each valve seat 36 is preferably constructed identically; therefore, only one of the valve seats will be described in detail.

With reference to FIG. 2, each valve seat 36 is an annular member constructed of a hard metal substance. On the surface of seat 36 confronting ball 22, the seat is provided with an annular groove 38 which receives an annular insert or face seal 40 having a machined surface for sealing against the adjacent surface of ball 22. A lip 42 may be forced into face seal 40 in order to assist in holding the seal in place. Immediately outwardly of groove 38, seat 36 presents a corner which is designated by reference numeral 44. The cylindrical inside surface of seat 36 terminates in a corner 46 which is spaced well inwardly of corner 44. Corners 44 and 46 are normally spaced away from ball 22, with face seal 40 providing a seal against the ball. Seal 40 is preferably constructed of a material available under the trademark "Teflon" or a similar substance which is able to effectively seal against the metal ball 22.

The outside surface of seat 36 has a stepped configuration. The outer or left end portion of seat 36 has a cylindrical outside surface 48 which is sealed against the adjacent surface of valve body 12 by a relatively soft seal ring 50. Ring 50 is preferably constructed of "Teflon" or a similar material and is mounted in an annular groove formed in surface 48. An intermediate portion of seat 36 presents a flat shoulder 52 which faces generally outwardly or away from ball 22 toward a larger shoulder 54 formed on body 12. Between shoulders 52 and 54, the outside diameter of seat 36 is less than the diameter of the seat pocket which is defined by a cylindrical surface 56 concentric with passage 24 and leading to valve chamber 20. An annular spring chamber 58 is provided in the space between shoulders 52 and 54 and surfaces 48 and 56.

Valve seat 36 has a plurality of lubricant passages 60 which extend from shoulder 52 to the space formed between corner 46 and face seal 40. Passage 60 thus communicates with spring chamber 58 and with another lubricant passage 62 formed through body 12 and terminating at spring chamber 58. Passage 62 is normally plugged at its outer end and is used to deliver emergency sealing compound or lubricant to ball 22.

The inner end of seat 36 is enlarged relative to the intermediate portion to provide a shoulder 64 which faces generally outwardly toward shoulder 54. Disposed against shoulder 64 is a hard metal backup ring 66 having inclined legs 68 and 70 on its respective outside and inside diameters. Leg 68 contacts surface 56 at its outer end, while the inside leg 70 contacts the adjacent surface of valve seat 36 at its inner end.

A packing ring 72 provides a seal between seat 36 and valve body 12. Ring 72 has a pair of spaced apart legs 74 and 76 which are separated by an annular space 78 located between the legs. The outer leg 74 is located on the outside diameter of ring 72 in sealing contact with surface 56, while the inner leg 76 is located on the inside diameter of the packing ring in sealing contact with the adjacent surface of seat 36. The end surfaces of legs 74 and 76 are beveled as indicated at 80 and 82, respectively.

An annular metal wedge 84 acts to spread apart legs 74 and 76 of packing ring 72. Wedge 84 is constructed of a hard metal substance and includes a tapered nose portion 86 which contacts the beveled surfaces 80 and 82 of packing ring 72 in order to spread the legs of the packing ring apart by wedging action. At its end opposite nose portion 86, wedge 84 has an outwardly projecting lip 88 which contacts surface 56. Projecting radially inwardly in a direction opposite from lip 88 is an enlarged flange portion 90 of wedge 84. The inside surface of flange 90 is spaced slightly outwardly of surface 48, while packing ring 72 normally holds flange 90 away from shoulder 52 and the adjacent end of lubricant passage 60. Consequently, lubricant can normally be injected through passage 62 and spring chamber 58, past flange 90, and through passage 60 for application to ball member 22.

The main body of wedge 84 may in some instances be provided with an opening 92 which extends between spring chamber 58 and space 78. If provided, opening 92 transmits fluid pressure from chamber 58 to space 78 in order to assist in spreading legs 74 and 76 apart for more effective sealing. It is contemplated that opening 92 will be eliminated in many situations, most notably when it is anticipated that valve 10 will be used to handle combustible fluids.

A spring assembly in the form of a plurality of wave springs 94 is mounted in the annular spring chamber 58. Wave springs 94 act against shoulder 54 and wedge 84 to continuously urge the wedge toward packing ring 72. The springs thus assure that legs 74 and 76 will be wedged apart to provide an effective seal at low pressures.

In use, ball 22 may be rotated between the open and closed positions to control the flow of fluid through valve 10. In normal high temperature service face seal 40 provides an effective seal between seat 36 and ball member 22, as shown in FIG. 2. The outside diameter of seat 36 is sealed against the valve body 12 by ring 50 and by packing ring 72. The wedging action between tapered nose portion 86 of wedge 84 and beveled surfaces 80 and 82 of packing ring 72 spreads legs 74 and 76 apart in order to increase the effectiveness of the seal between the valve seat and body. Packing ring 72 is thus squeezed between wedge 84 and backup ring 66 under the influence of springs 94. In addition, any fluid pressure in spring chamber 58 acts against wedge 84 and is also transmitted through opening 92 to space 78 in order to increase the spreading action of legs 74 and 76. Backup ring 66 assists in sealing seat 36 to the valve body since its legs 68 and 70 are pressed against body 12 and valve seat 36, respectively. Emergency lubrication can be effected by injecting lubricant into passage 62 in the manner indicated previously.

In the event of a fire, face seal 40, seal ring 50, and packing ring 72 are all destroyed. The fluid pressure which leaks past the area of ring 50 into spring chamber 58 cooperates with springs 94 to press wedge 84 against valve seat 36 and to press seat 36 against ball member 22, as shown in FIG. 3. Corners 44 and 46 then provide effective metal-to-metal seals between seat 36 and ball 22 in order to impede leakage through the valve.

In the absence of packing ring 72, wedge 84 is pressed against seat 36 by the combined force of the fluid pressure and springs 94 so that flange 90 flatly contacts shoulder 52 in order to close off lubricant passage 60. Also, lip 88 seals against surface 56 and flange 90 seals against shoulder 52 to effectively seal the valve seat and body. As previously indicated, opening 92 is preferably eliminated if the valve is exposed to the possibility of fire. Backup ring 66 assists in providing an effective seal between the valve seat and body. It is pointed out that increased fluid pressure increases the force with which legs 68 and 70 are urged against body 12 and valve seat 36, respectively. Consequently, the legs of ring 66 provide effective metal-to-metal seals between seat 36 and body 12 to impede leakage through the valve. In addition, lubricant passage 60 is effectively closed off by flange 90 to eliminate fluid flow through the lubricant passage.

It is pointed out that the fluid pressure and wave springs 94 cooperate to actuate the metal-to-metal seals which are effected under fire conditions. Therefore, even if springs 94 are worn or otherwise damaged, the fluid pressure is effective by itself to assure that undue leakage will not occur. It is contemplated that seat arrangements constructed in accordance with the present invention will be used on both the upstream and downstream sides of ball 22. However, in some situations the seat will be employed only on the upstream side with a more conventional type of valve seat used on the downstream side of the ball. As previously indicated, opening 92 will often be eliminated since its purpose is merely to transmit fluid pressure to space 78 and its presence decreases the effectiveness of wedge 84 as a seal element under fire conditions.

What is claimed is:
1. A valve comprising:
a valve body having a valve chamber and a fluid flow passage;
a valve member mounted in said valve chamber for movement between an open position and a closed position relative to said flow passage;
an annular valve seat mounted about said flow passage for sealing against the valve member, said valve seat having a lubricant passage therein adapted to receive lubricant for emergency sealing;
a fire destructible packing ring extending around said valve seat to provide a seal between the valve seat and body;
a metal wedge element mounted around said valve seat adjacent said packing ring, said wedge element having a projecting portion thereof normally held away from said lubricant passage by said packing ring but adapted to close off said lubricant passage upon destruction of said packing ring; and resilient means for urging said wedge element against said packing ring to expand the packing ring against said valve body and valve seat by wedging action, said resilient means acting to force said projecting portion of the wedge element against said valve seat at a location to close off said lubricant passage upon destruction of said packing ring.

2. A valve as set forth in claim 1, including a metal ring member mounted about said valve seat in a substantially stationary position relative thereto with said packing ring squeezed between the wedge element and metal ring member, said ring member contacting the valve seat and body in sealing relation to assist in preventing leakage therebetween upon destruction of said packing ring.

3. A valve as set forth in claim 2, including a shoulder on said valve seat facing generally away from said valve member, said metal ring being located adjacent said shoulder.

4. A valve as set forth in claim 3, including a second shoulder on said valve body facing generally toward the first mentioned shoulder, said resilient means acting between said second shoulder and wedge element to urge the latter generally toward the first mentioned shoulder.

5. A valve as set forth in claim 1, including a fire destructible face seal carried on said valve seat in sealing contact with said valve member, said resilient means acting to force said valve seat into sealing contact with said valve member upon destruction of said face seal.

6. A valve as set forth in claim 1, including a fire destructible seal ring providing a seal between said valve seat and body, said packing ring being located between said seal ring and valve member.

7. A valve as set forth in claim 1, wherein said projecting portion of the wedge element comprises a flange projecting generally inwardly from the wedge element adjacent said lubricant passage.

8. A valve as set forth in claim 1, wherein:
said valve body includes a shoulder spaced from and facing toward said wedge element to define a spring chamber between said shoulder and wedge element;
said resilient means comprises a spring mounted in said spring chamber to urge said wedge element generally away from said shoulder;
said lubricant passage is in communication with said spring chamber; and
said valve body includes a passageway communicating with said spring chamber to deliver lubricant thereto.

9. A valve as set forth in claim 8, wherein:
said packing ring includes a pair of legs engaging said valve seat and body in sealing relation, said legs being separated by a space; and
said wedge element includes an opening providing communication between said spring chamber and said space to transmit fluid pressure to said space for urging said legs away from one another against the valve seat and body.

10. A valve as set forth in claim 1, wherein:
said packing ring includes first and second spaced apart legs respectively engaging said valve seat and valve body in sealing relation; and
said wedge element includes a tapered portion disposed between said legs in contact therewith to spread the legs apart by wedging action upon movement of said wedge element toward said packing ring.

11. In a ball valve having a valve body with a fluid flow passage, a ball member mounted in the valve body for rotation to open and close the flow passage, and an annular valve seat mounted about the flow passage to seal against the ball member and having an intermediate annular shoulder facing rearwardly, the improvement comprising:
a relatively soft packing ring extending around the valve seat to provide a seal between the valve seat and body;
a metal wedge element mounted around the valve seat adjacent said packing ring; a metal ring member mounted about the valve seat in abutting relation to said intermediate shoulder with said packing ring squeezed between the wedge element and metal ring member, said ring member having inclined legs about its inner and outer diameters for contacting the valve seat and body in sealing relation to assist in preventing leakage therebetween upon destruction of said packing ring; and
means for urging said wedge element against said packing ring in a manner to expand the packing ring by wedging action against the valve seat and body, said urging means forcing said wedge element against said valve seat and body in sealing relation therewith upon destruction of said packing ring, whereby said wedge element assists in preventing leakage between the valve seat and body upon destruction of said packing ring.

12. The improvement set forth in claim 11, including a fire destructible face seal carried on the valve seat in sealing contact with said ball member, said urging means forcing the valve seat into sealing contact with the valve member upon destruction of said face seal.

13. The improvement set forth in claim 11, including:
a lubricant passage in the valve seat for applying emergency sealant to the ball member; and
a flange portion of said wedge element normally held away from said lubricant passage by said packing ring, said urging means forcing said flange portion against the valve seat at a location to substantially close off said lubricant passage upon destruction of said packing ring.

14. The improvement set forth in claim 11, wherein:
said packing ring includes first and second spaced apart leg portions respectively engaging said valve seat and valve body in sealing relation; and
said wedge element includes a tapered portion disposed between said leg portions in contact therewith to spread the leg portions against the valve seat and valve body by wedging action upon movement of said wedge element toward said packing ring.

15. The improvement set forth in claim 14, wherein each of said leg portions presents a beveled surface engaged by said tapered portion of the wedge element in a manner to spread said leg portions apart upon movement of said wedge element toward said packing ring.

* * * * *